Patented Mar. 6, 1934

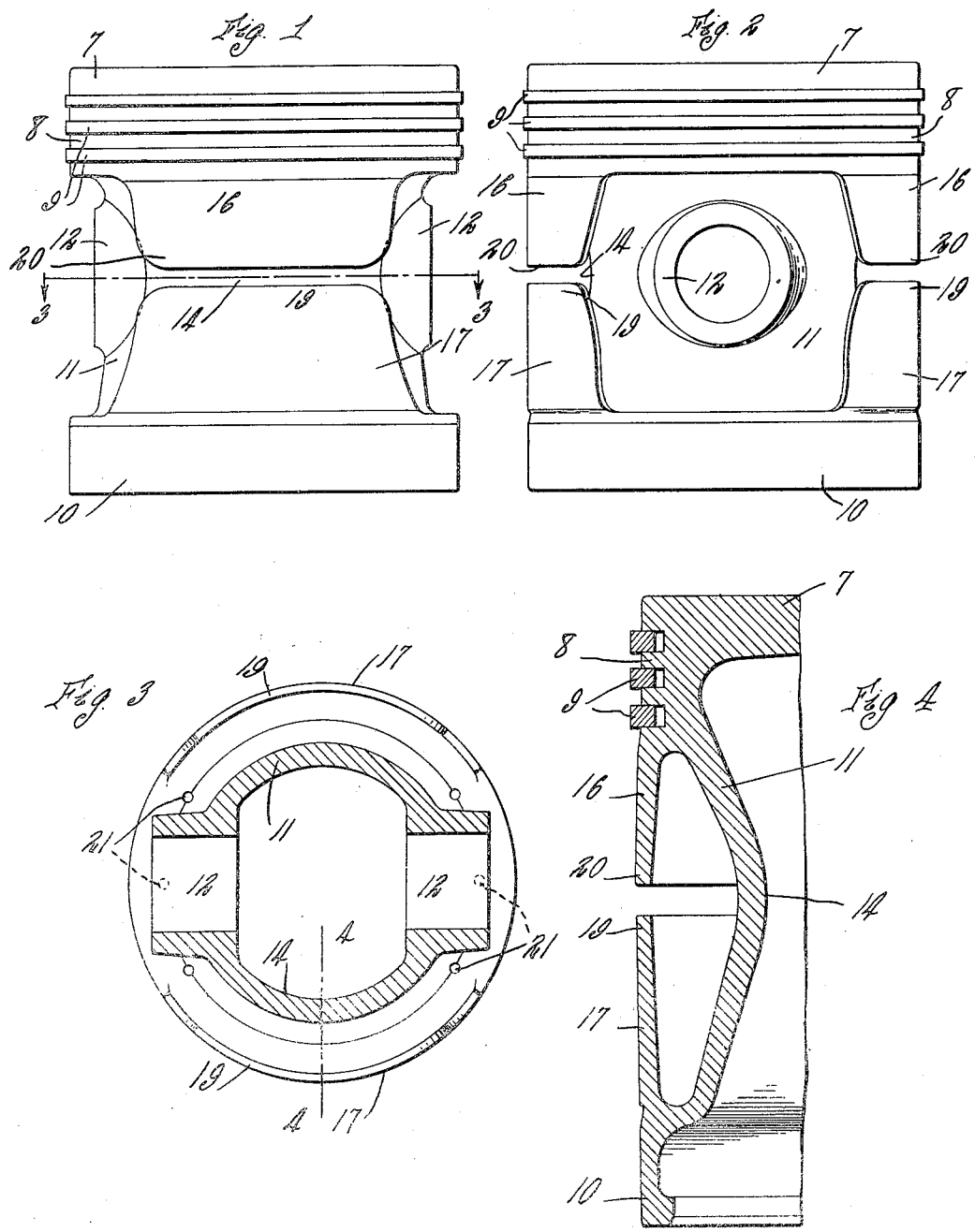

1,949,542

UNITED STATES PATENT OFFICE 1,949,542

PISTON

Elwood T. Larkin, Amherst, N. Y., assignor to Charles A. Criqui, Buffalo, N. Y.

Application July 16, 1931, Serial No. 551,202

1 Claim. (Cl. 309—11)

This invention relates to pistons for use in connection with engines in which no crosshead is employed.

The objects of this invention are to provide a piston of this kind which is designed to eliminate or reduce what is known as piston slap; also to provide a piston of this kind which, when hot, has a slightly greater diameter at a portion thereof intermediate between the ends than at the ends of the piston; also to provide a piston of this kind which is provided with wrist pin bearing supports of improved construction; also to provide a piston in which the opposite ends are connected by an intermediate portion forming a wrist pin bearing support arranged out of contact with the engine cylinder and in which these ends are provided with skirts extending toward each other and toward the intermediate portion of the piston; also to provide a piston of this kind in which the upper ends of the lower skirts are of greater diameter than the lower end of the piston when the piston is working at its normal operating temperature; also to provide a piston of this kind which provides for springiness of certain skirt parts contacting with the cylinder wall; also to provide a piston of this kind in which the portion connecting the upper and lower portions of the piston is of a rigid and unsplit power and heat transmitting structure and supports the wrist pin bearings; also to improve the construction of pistons in the other respects hereinafter specified.

In the accompanying drawing:

Figs. 1 and 2 are elevational views of a piston embodying this invention, the two elevations being taken at right angles to each other.

Fig. 3 is a sectional view thereof on line 3—3, Fig. 1.

Fig. 4 is an enlarged, fragmentary, sectional view on line 4—4, Fig. 3.

The piston shown in the accompanying drawing is of a single piece or unitary cast metal construction having the usual head 7, an integrally-formed cylindrical portion 8 forming the ring zone of the piston, and having the usual piston rings 9 arranged in grooves in the ring zone in accordance with the usual custom. The piston also has a lower cylindrical portion 10. In accordance with this invention, these two cylindrical end portions of the piston which are formed to cooperate with the cylinder wall in the usual manner, are connected by an integrally formed, intermediate part 11 of materially reduced diameter and in which the wrist pin bearings 12 are preferably formed. The upper portion of this connecting part 11 of reduced diameter forms a continuous and unbroken connection between the upper and lower portions of the piston and serves to transmit pressure from the head of the piston to the wrist pin bearings, and also serves to transmit heat from the upper portion of the piston to the lower cylindrical portion 10 thereof. The intermediate connecting portion 11 of the piston may be of any suitable or desired form, that shown having a materially smaller diameter at the middle portion 14 thereof than at the upper and lower ends, thus being substantially of an hourglass shape, as clearly shown in Fig. 4. This shape has the advantage of forming a firmer support for the wrist pin bearings 12, in that different portions of these bearings are formed integral with the connection portion 11, the outer portions of these bearings being formed integral with the intermediate portion 11 at their upper and lower parts, as shown in Fig. 1, and the inner ends of the bearings being supported by and formed integral with the intermediate portion 11 at the sides of the bearings, as shown in Fig. 3. The connecting intermediate portion of the piston may, however, be of any other suitable or desired form.

In order to provide for a more extended surface of contact between the piston and the cylinder walls, the upper and lower portions of the piston may be provided with integral skirts of any suitable or desired form. In the particular construction shown, the piston is provided at opposite sides of the wrist pin bearings with depending skirts 16, the upper edges of which are formed integral with the ring zone 8 of the piston and which terminate approximately at the portion of the piston intermediate the upper and lower ends thereof. The lower cylindrical portion 10 of the piston is provided with similar integrally formed skirts 17 extending upwardly from the lower portion 10 and terminating adjacent to but spaced from the downwardly depending skirts 16. These skirts are spaced from the intermediate portion 11 of the piston and form an extended bearing or contact surface with the cylinder walls. In the construction shown, these skirts are provided at opposite sides of the axis of the wrist pin bearings, which sides of the piston are subjected to lateral thrusts, but if desired, these skirts may be extended either entirely or to any desired extent around the piston.

This structure as thus far described, has the advantage that the integrally formed intermediate portion, which forms an unbroken or uninterrupted connection between the upper and lower portions of the piston, forms an excellent conductor of heat from the upper to the lower portion of the piston, and thus facilitates the conductance of heat to the cylinder walls. The intermediate portion as described also forms a strong and rigid connection between the piston and the wrist pin bearings.

The construction described also renders itself readily adaptable to the elimination or reduction of piston slap, caused by alternate side thrusts of the piston rod on the piston, and this can be accomplished by providing the piston with a slightly greater diameter at a portion thereof intermediate the upper and lower ends of the piston than at the ends. For example, in the particular construction shown, this is accomplished by providing a greater diameter at the upper ends 19 of the upwardly extending skirt portion 17, than at the lower end of the piston and by providing a gradually tapered surface on the skirt portions of the piston, which taper gradually reduces the diameter of the skirt portion 17 from the upper to the lower ends thereof. It will be understood that this difference in diameter must be very slight, amounting in an average sized piston probably only to several thousandths of an inch. It will be understood that it is intended that the diameter of the middle portion of the piston shall be greater than the end portions when the piston is at the operating temperature of the engine.

In a similar manner the edge portions 20 of the skirts 16 may be of greater diameter than the diameter of the ring zone and may be tapered.

When a piston is constructed so as to have a slightly larger diameter in the middle portion thereof than at the ends, and is operating in a cylinder, the oil or lubricant collects in the thin space of wedge-shaped cross section between the skirt of the piston and the cylinder wall. Consequently, when the wrist pin is subjected to laterally acting pressure due to the inclination of the piston rod, the tendency of either end of the piston to slap or pound against the cylinder wall is opposed by the compression of the film of oil in the wedge-shaped space between the piston and the cylinder wall. Since the upper portions 19 and 20 of the skirts 17 and 16 will be in contact with the cylinder wall, before the end portions contact therewith, these films of oil can only be forced laterally and away from the middle portion of the piston by the side thrust acting on the piston, and this flow of the oil is, therefore, retarded so that the oil acts as a shock absorber or cushion to prevent any sudden or sharp impact of the end portions of the piston against the cylinder wall, and thus to prevent noise which would otherwise result.

By forming the skirts only part way around the periphery of the piston, these skirts will have a certain amount of springiness or resiliency which tends to absorb a portion of the side thrust on the piston and also helps to reduce the piston slap. Piston slap, however, may be eliminated or reduced by making the middle portion of the piston of greater diameter than the lower end portions, even though the skirt of the piston extends entirely around the same.

21, Fig. 3, represents oil drain holes extending from the ledge formed between the upper edge of the lower portion 10 of the piston and the connecting portion 11, to the interior of the piston, to permit oil collecting on this ledge to return to the crank case of the engine.

I claim as my invention:

A piston having upper and lower cylindrical portions formed to cooperate with a cylinder, an intermediate portion forming circumferentially continuous connections with the upper and lower cylindrical portions and having wrist pin bearings formed therein, and skirt portions extending toward each other from said upper and lower cylindrical portions at opposite sides of said wrist pin bearings, the adjacent ends of said skirt portions being of greater diameter when at operating temperatures than the parts thereof connecting with said upper and lower cylindrical portions, said skirt portions being resilient to yield when forced against a cylinder wall by side thrusts on said wrist pin bearings.

ELWOOD T. LARKIN.